(12) United States Patent
Shang

(10) Patent No.: US 8,189,985 B2
(45) Date of Patent: May 29, 2012

(54) LIGHT GUIDE PLATE TEMPLATE AND MANUFACTURING METHOD THEREOF

(75) Inventor: Fei Shang, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 12/538,972

(22) Filed: Aug. 11, 2009

(65) Prior Publication Data

US 2010/0039723 A1    Feb. 18, 2010

(30) Foreign Application Priority Data

Aug. 15, 2008  (CN) .......................... 2008 1 0118394

(51) Int. Cl.
*G02B 6/00*  (2006.01)
(52) U.S. Cl. .......... 385/147; 362/558; 362/616; 349/61; 349/62; 349/64; 349/65
(58) Field of Classification Search .................. 362/616
See application file for complete search history.

(56) References Cited

U.S. PATENT DOCUMENTS 4,411,490 A * 10/1983 Daniel ........................... 126/648
2008/0042307 A1 * 2/2008 Ueno et al. ..................... 264/2.5

FOREIGN PATENT DOCUMENTS

| CN | 1786792 A | 6/2006 |
| CN | 101034183 A | 9/2007 |
| CN | 101241810 A | 8/2008 |
| JP | 2004-249538 A | 9/2004 |
| TW | 299644 Y | 10/2006 |
| TW | 305359 U | 1/2007 |

* cited by examiner

*Primary Examiner* — Uyen Chau N Le
*Assistant Examiner* — Chad Smith
(74) *Attorney, Agent, or Firm* — Ladas & Parry LLP

(57) ABSTRACT

A light guide plate template which comprises a frame and a plurality of light guide plate building blocks which are arranged in the frame to form an integral light guide plate, each of the light guide plate building blocks has dots on its bottom surface to make it have a predetermined light-emitting efficiency.

6 Claims, 3 Drawing Sheets

LIGHT GUIDE PLATE TEMPLATE AND MANUFACTURING METHOD THEREOF

BACKGROUND OF THE INVENTION

Embodiments of the present invention relate to a light guide plate template and a manufacturing method thereof.

In thin film transistor liquid crystal displays (TFT-LCDs), since the liquid crystal display panel cannot emit light by itself, a light-emitting member as a backlight is arranged behind the liquid crystal display panel. However, the effect and uniformity of the light emitted from the backlight are influenced by many factors such as the light efficiency of the light guide plate and the like.

In order to enhance accuracy in designing a light guide plate, high image quality and good optical characteristics conventionally are expected by the following steps: firstly performing dot design and preliminary optical simulation with software to obtain a light guide plate template that meets the industrial standards; next performing a dot printing on the basis of the above light guide plate template to form a light guide plate; and then the light guide plate is assembled within a backlight and subject to performance tests, comprising an optical characteristics test and an image quality test.

However, in the above process, because the steps of performing dot design with software and manufacturing a light guide plate template according to the dot design are limited by the employed software and the factors of the optical simulation, the light guide plate template can not be adjusted effectively, so that the accuracy of the resultant light guide plate template is low. Moreover, the light guide plate template have to be refreshed in manufacturing light guide plates on the basis of the light guide plate template, which leads to waste of time and high expense and in turn an increased cost of manufacturing liquid crystal display panels.

SUMMARY OF THE INVENTION

The present invention intends to provide a light guide plate template and a manufacturing method thereof which realize time and expense saving in manufacturing the light guide plate template.

An embodiment of the present invention provides a light guide plate template light guide plate template comprising: a frame; and a plurality of light guide plate building blocks, which are arranged in the frame to form an integral light guide plate. Each of the light guide plate building blocks has dots on its bottom surface so as to have a predetermined light-emitting efficiency.

Another embodiment of the present invention provides a method of manufacturing the light guide plate template, comprising the following steps: manufacturing a plurality of light guide plate building blocks each having a predetermined light-emitting efficiency; arranging the plurality of the light guide plate building blocks in a frame to form a test light guide plate based on optical simulation results and the predetermined light-emitting efficiency of the plurality of light guide plate building blocks; and performing an optical test on the test light guide plate and forming a light guide plate template according to the results of the optical test.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Embodiments of the present invention will be described below with reference to the attached drawings.

Figure 1:
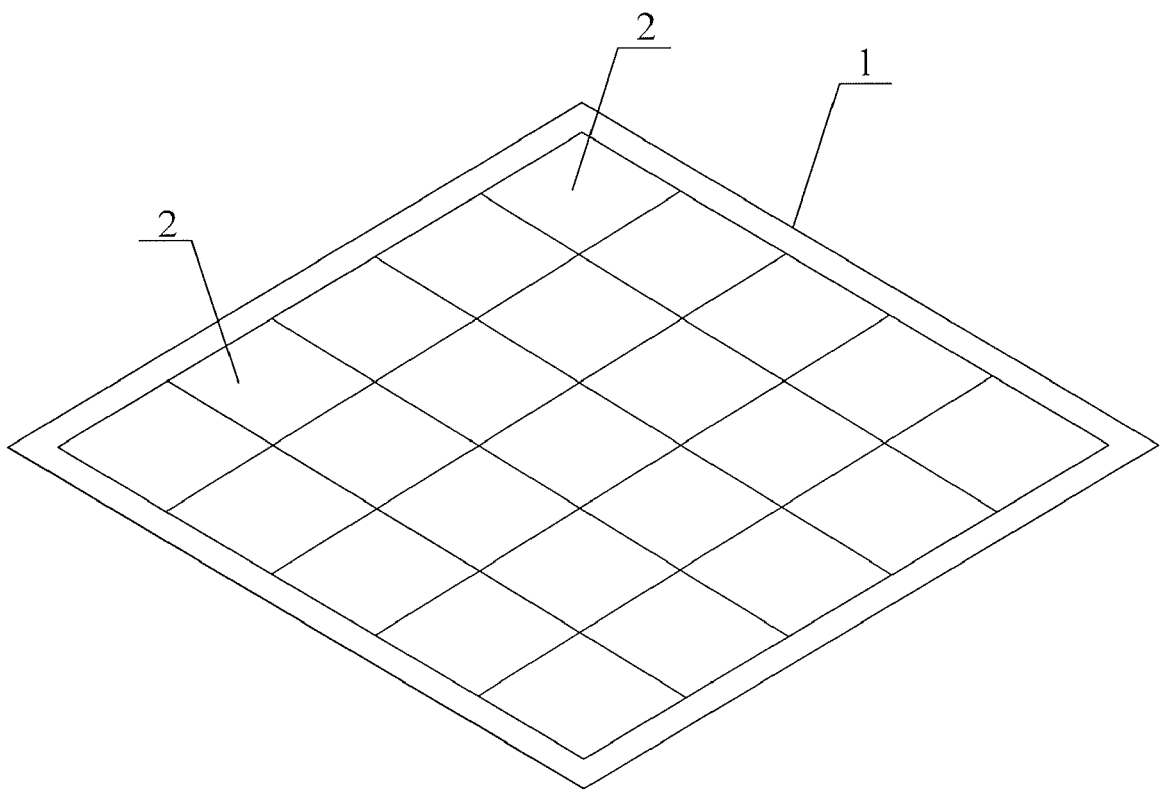
FIG. 1 is a structural schematic view showing an exemplary light guide plate template according to an embodiment of the present invention.

FIG. 1 is a structural schematic view showing an exemplary light guide plate template according to an embodiment of the present invention. As shown in FIG. 1, the exemplary light guide plate template comprises a frame 1 and a plurality of light guide plate building blocks 2, which are arranged in the frame to form an integral light guide plate. Each of the light guide plate building blocks 2 has dots (not shown) formed on its bottom surface so as to have a predetermined light-emitting efficiency.

The light guide plate template formed of the plurality of light guide plate building blocks 2 that are pieced together and arranged in the frame 1 is in a detachable form. During the optical test, one or more light guide plate building blocks 2 with a predetermined light-emitting efficiency in the light guide plate template can be adjusted at any time according to the test results and the theoretical characteristic values. For example, a light guide plate building block with local brightness abnormality can be replaced by a light guide plate building block which meets the design requirements from the manufactured light guide plate building blocks, or such light guide plate building block can be re-manufactured according to the requirements.

In this embodiment, the frame 1 can be of a cavity or other configuration, as long as it can hold and fix the light guide plate building blocks 2 together stably for the subsequent process and test.

In this embodiment, the light guide plate building blocks 2 are similar to weights, made of acrylic or other suitable materials having high transmittance of approximate 95% or higher. The side surfaces of each light guide plate building block 2 are smoothed through polishing and grinding process. Each light guide plate building block 2 may have a width of about 1.0 cm and a length of about 1.0 cm. Since the side surfaces of the light guide plate building blocks 2 are polished, when the light guide plate building blocks 2 are pieced together, the smoothed side surfaces can be conveniently placed together almost without gaps between the side surfaces. The size of the guide plate building blocks 2 can be designed according to the requirements. As for large-sized products, large-sized light guide plate building blocks are used. As for small-sized products, small-sized light guide plate building blocks are used. After product testing and manufacturing, these light guide plate building blocks 2 can be disassembled and packed for further management.

According to the results of the SPEOS optical analysis, the output power of an integral light guide plate is about 1.124 watt (W), while the output power of a light guide plate template according to the present embodiment is about 1.112 W, which is lower than that of the integral light guide plate by 1% only. Obviously, the light guide plate template according to the present embodiment can reflect the actual optical effect of the light guide plate within the allowable range of error and so is practical.

In the embodiment, the predetermined light-emitting efficiency of the light guide plate building blocks 2 may be determined on the basis of the printing area of dots per unit area on the bottom surfaces of the light guide plate building blocks 2, and the theoretical value is generally within the range of 0-1. In the embodiment, the predetermined light-emitting efficiency of the light guide plate building blocks 2 can comprise 10 levels, that is, 0.1, 0.2, 0.3, 0.4, 0.5, 0.6, 0.7, 0.8, 0.9 and 1, divided equally by an interval of 0.1 from 0.1 to 1. In practice, the light guide plate building block 2 that meets design requirements can be easily re-manufactured when needed.

In this embodiment, the light guide plate template is obtained from the plurality of light guide plate building blocks 2 pieced together and arranged in the frame 1, the light guide plate building blocks 2 can be adjusted locally according to the optical test results, thus the design accuracy of the light guide plate template can be effectively ensured, and the problem of low design accuracy of the light guide plate template is overcome. In addition, since the light guide plate building blocks can be reusable, the manufacturing period of the light guide plate template is shorten and the expense of manufacturing the light guide plate template decreases, thus the problem of long manufacturing period and high expense and in turn high manufacture cost of the liquid crystal display panel is overcome.

Figure 2:
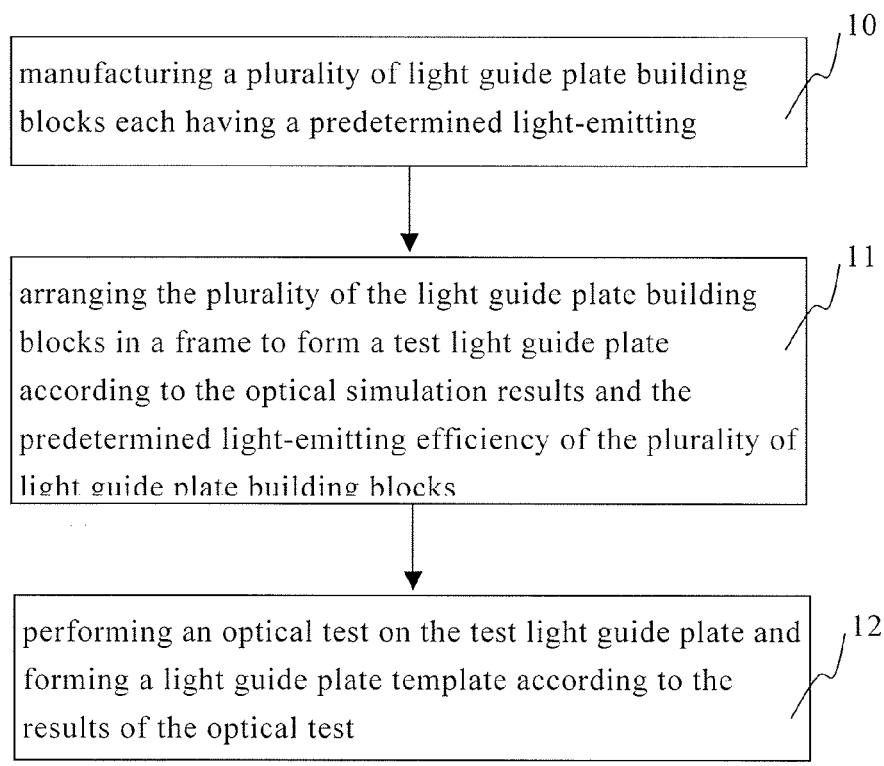
FIG. 2 is a flow chart of an exemplary method of manufacturing the light guide plate template according to an embodiment of the present invention.

FIG. 2 is a flow chart of an exemplary method of manufacturing the light guide plate template according to an embodiment of the present invention. As shown in FIG. 2, the method of manufacturing the light guide plate template may comprise the following steps.

Step 10: manufacturing a plurality of light guide plate building blocks each having a predetermined light-emitting efficiency.

In this embodiment, the predetermined light-emitting efficiency of the light guide plate building block 2 may be 0.1, 0.2, 0.3, 0.4, 0.5, 0.6, 0.7, 0.8, 0.9 or 1.

Step 11: according to the optical simulation results and the predetermined light-emitting efficiency of the plurality of light guide plate building blocks, arranging the plurality of the light guide plate building blocks in a frame to form a test light guide plate.

During forming a actual light guide plate based on the light guide plate template, optical simulation can be conducted for the actual light guide plate to be manufactured with the aids of an optical simulation software (for example, SPOES) to obtain an optical simulation results that are the basis of the theoretical characteristic values of the actual light guide plate, such as local light-emitting efficiency of the light guide plate, dot printing area, etc. In this embodiment, after obtaining the optical simulation results of the actual light guide plate, according to the optical simulation results and the light-emitting efficiency of each light guide plate building block, the plurality of light guide plate building blocks are pieced and held together by a frame to form a test light guide plate and subsequently form the light guide plate template.

Figure 3:
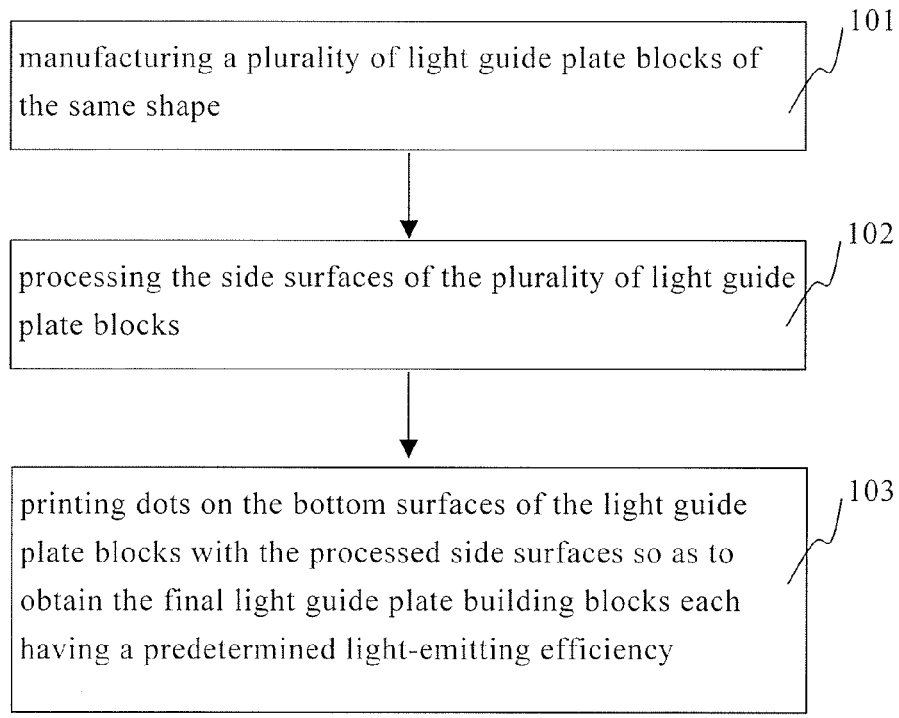
FIG. 3 is a flow chart of manufacturing the light guide plate building blocks according to the present invention.

FIG. 3 is a flow chart of manufacturing the light guide plate building blocks according to an embodiment of the present invention. As shown in FIG. 3 the process of forming a light guide plate building block may comprise the following steps.

Step 101: manufacturing a plurality of light guide plate blocks of the same shape.

In the step 101, the manufactured plurality of light guide plate blocks have a width of about 1.0 cm and a length of about 1.0 cm.

Step 102: processing the side surfaces of the plurality of light guide plate blocks.

The side surfaces of the plurality of light guide plate blocks are polished and grinded to form smooth surfaces in order to piece together almost without gaps between the pieced light guide plate building blocks.

Step 103: printing dots on the bottom surfaces of the light guide plate blocks with the processed side surfaces so as to obtain the final light guide plate building blocks each having a predetermined light-emitting efficiency.

The light guide plate blocks are printed with dots according to the dot design for the light guide plate building blocks, and the plurality of light guide plate building blocks have a plurality of light-emitting efficiencies of 0.1, 0.2, 0.3, 0.4, 0.5, 0.6, 0.7, 0.8, 0.9 or 1 respectively.

Step 12: performing an optical test on the test light guide plate and forming a light guide plate template according to the results of the optical test.

Through the foregoing steps, a test light guide plate based on the combination of the plurality of light guide plate building blocks is formed. Since the optical simulation results may not be very precise and processing defects may exist during the dot printing of the light guide plate blocks, the optical effects of the test light guide plate and the actual light guide plate may be different. However, the test light guide plate of the present embodiment is formed by piecing together the plurality of light guide plate building blocks, so if it is determined that the test light guide plate has local brightness abnormalities on the basis of an optical test results, the light guide plate building blocks with abnormal brightness can be replaced directly, forming a light guide plate template without local brightness abnormalities. As a result, the design precision of the light guide plate template can be ensured, and the problem that the light guide plate template having local brightness abnormalities cannot be adjusted locally can be overcome. Moreover, after testing and adjusting, these light guide plate building blocks can be disassembled and packed for further management and reuse. In contrast, conventionally the light guide plate template must be made every time, and thus the manufacturing period is long, the expense is high, and the total cost for manufacturing a liquid crystal display panel is high.

When the image displayed on the liquid crystal display panel is subject to test, the image is generally divided into nine blocks in a 3×3 array, and a brightness test is made in the center of each block to obtain the light-emitting efficiency results. The ratio of the light-emitting efficiency of the darkest block to that of the brightest block is referred to as nine-point uniformity, which is a very important criterion for evaluating image quality. When image quality deteriorates, for example, local brightness abnormality occurs, the nine-point uniformity will go beyond the normal range (different manufacturers have different nine-point uniformity normal ranges), and in that case one or more light guide plate building blocks on the test light guide will be adjusted accordingly.

Figure 4:
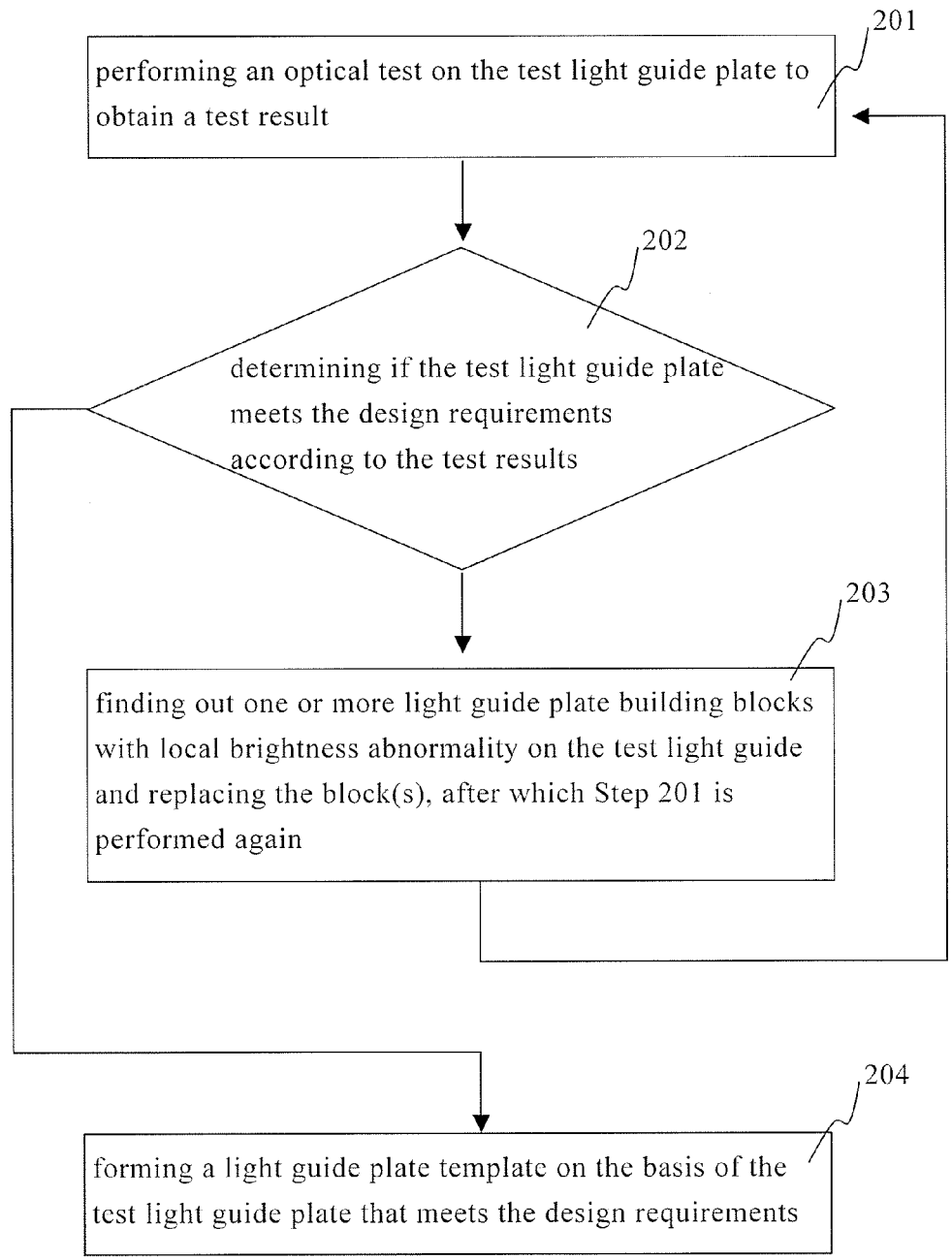
FIG. 4 is a flow chart of performing an optical test on a test light guide plate and forming a light guide plate template according to the present invention.

FIG. 4 is a flow chart of performing an optical test on a test light guide plate and forming a light guide plate template according to an embodiment of the present invention. As shown in FIG. 4, an optical test is performed and a light guide plate template is formed according to the test results by the following steps.

Step 201: performing an optical test on the test light guide plate to obtain a test result.

Step 202: determining if the test light guide plate meets the design requirements according to the test results. If yes, then Step 204 is performed, otherwise Step 203 is performed.

In order to enhance the design precision of the light guide plate template, the test light guide plate is preferably subject to optical test many times, and the test results are compared with the theoretical property values of the optical simulation to determine whether the resultant test light guide plate meets the design requirements, such as center brightness, light-emitting efficiency, and etc.

Step 203: finding out one or more light guide plate building blocks with local brightness abnormality on the test light guide and replacing the block(s), after which Step 201 is performed again.

If the test results in Step 202 show that the test light guide plate fails to meet the design requirements, the position where local brightness abnormality occurs should be determined to find out and replace the corresponding one or more light guide plate building blocks, and Step 201 and Step 202 are conducted repeatedly to obtain a light guide plate template which meets the design requirements.

Step 204: forming a light guide plate template on the basis of the test light guide plate that meets the design requirements.

In this embodiment, if the test results in Step 202 show that test light guide plate meets the design requirements, then a light guide plate template can be formed directly. However, since the smooth surfaces of the light guide plate building block and the gaps therebetween influence consistently on the light-emitting efficiency, and also the influence of the material of the light guide plate on the light-emitting efficiency is considered, a compensatory light transmittance may be added to the test light guide plate when forming the light guide plate template on the basis of the test light guide plate. For example, the center brightness of the test light guide plate is 4000 nit, while the center brightness of the actual light guide plate is 5000 nit, a compensatory light transmittance factor of 1.25 can be employed to the test light guide plate. As long as the resultant light guide plate building blocks are made of the same material and the gaps formed between the light guide plate building blocks are constant in size, the compensatory light transmittance is kept constantly when forming the light guide plate template, for example, a compensatory light transmittance factor of 1.25.

In this embodiment, a defective light guide plate (which is the light guide plate made on the basis of the conventionally light guide plate template) is reproduced by arranging a plurality of light guide plate building blocks in a frame. The reproduced defective light guide plate can be used as a sample for the analysis with respect to the image quality of the defective light guide plate before reproduction since they have the same image qualities. By optical simulation and test, the light guide building blocks with abnormal light-emitting efficiency on the reproduced defective light guide plate are replaced, and a new effective light guide plate is made on the basis of the reproduced and adjusted defective light guide plate.

In this embodiment, a test light guide plate is formed by piecing together the plurality of light guide plate building blocks and arranging them in a frame, after the optical test on the test light guide plate, one or more light guide plate building blocks with abnormal brightness are adjusted directly so as to form a light guide plate template without local brightness abnormalities. As a result, the design precision of the light guide plate template can be ensured. Moreover, the light guide plate building blocks are reusable, which shorten the manufacturing period and reduce the expense of manufacturing the light guide plate template. In contrast, conventionally the period for manufacturing the light guide plate template is long, and the expense is high, so the total cost for manufacturing a liquid crystal display panel is high.

In the embodiments, during dot printing, the mixture ration of the ink may influence the optical characteristics of the light guide plate, and in the embodiments it is assumed that same ink is employed.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A method of manufacturing a light guide plate template, comprising the following steps:
    manufacturing a plurality of light guide plate building blocks each having a different predetermined light-emitting efficiency level, wherein the different predetermined light-emitting efficiency levels are divided by an interval;
    selecting a plurality of light guide plate building blocks from the plurality of light guide plate building blocks each having the different predetermined light-emitting efficiency level and arranging the selected plurality of the light guide plate building blocks in a frame to form a test light guide plate based on optical simulation results and the predetermined light-emitting efficiency of the plurality of light guide plate building blocks; and
    performing an optical test on the test light guide plate and adjusting arrangement of the building blocks in the test light guide plate by comparing results of the optical test with predetermined design requirements on the light guide plate template so as to form the light guide plate template.

2. The method to claim 1, wherein manufacturing a plurality of light guide plate building blocks each having a predetermined light-emitting efficiency comprises the following steps:
    manufacturing a plurality of light guide plate blocks;
    processing side surfaces of the plurality of light guide plate blocks; and
    printing dots on a bottom surface of the light guide plate blocks with the processed side surfaces.

3. The method according to claim 1, wherein performing an optical test on the test light guide plate and forming a light guide plate template comprise the following steps:
    step (201) of performing an optical test on the test light guide plate to obtain test results;
    step (202) of determining if the test light guide plate meets the predetermined design requirements according to the test results, wherein if the test light guide plate meets the design requirements, the step (204) is performed, otherwise step (203) is performed;

step (203) of finding out and replacing the light guide plate building block with local brightness abnormality on the test light guide, and then performing step (201) again; and step (204) of forming a light guide plate template on the basis of the test light guide plate which meets the design requirements.

4. The method according to claim 2, wherein the plurality of light guide plate building blocks having a width of about 1.0 cm and a length of about 1.0 cm.

5. The method according to claim 2, wherein processing the side surfaces of the plurality of light guide plate blocks comprises polishing and grinding the side surfaces of the plurality of light guide plate blocks.

6. The method according to claim 3, wherein forming a light guide plate template comprises employing a compensatory light transmittance factor to the test light guide plate.

* * * * *